United States Patent
Childs

(10) Patent No.: US 10,822,172 B1
(45) Date of Patent: Nov. 3, 2020

(54) MERGER EXTENSION CHUTE AND CONVEYOR

(71) Applicant: CNH Industrial America LLC, New Holland, PA (US)

(72) Inventor: Albert Wayne Childs, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/397,296

(22) Filed: Apr. 29, 2019

(51) Int. Cl.
*B65G 11/20* (2006.01)
*B65G 11/18* (2006.01)
*B65G 47/44* (2006.01)
*B65G 47/20* (2006.01)

(52) U.S. Cl.
CPC .......... *B65G 11/206* (2013.01); *B65G 11/186* (2013.01); *B65G 47/44* (2013.01); *B65G 47/20* (2013.01); *B65G 2201/04* (2013.01); *B65G 2812/081* (2013.01)

(58) Field of Classification Search
CPC ... B65G 11/126; B65G 11/186; B65G 11/206; B65G 31/00; B65G 31/02
See application file for complete search history.

(56) References Cited

U.S. PATENT DOCUMENTS

| | | | | |
|---|---|---|---|---|
| 2,653,721 | A | * 9/1953 | Cantrell | A01D 87/122 414/523 |
| 3,665,689 | A | * 5/1972 | Richardson | A01D 34/83 56/27.5 |
| 4,532,941 | A | 8/1985 | Gauthier | |
| 5,215,403 | A | * 6/1993 | Peterson | E01C 19/15 239/672 |
| 5,351,468 | A | * 10/1994 | Pominville | A01D 57/20 56/192 |
| 6,212,865 | B1 | 4/2001 | Peeters et al. | |
| 6,331,142 | B1 | 12/2001 | Bischoff | |
| 7,028,459 | B2 | * 4/2006 | Lohrentz | A01D 57/20 56/192 |
| 7,220,179 | B2 | 5/2007 | Redekop et al. | |
| 7,526,908 | B1 | * 5/2009 | Rice | A01D 57/00 56/192 |
| 8,733,073 | B2 | 5/2014 | Ardison et al. | |
| 9,743,586 | B2 | 8/2017 | Biggerstaff | |

* cited by examiner

*Primary Examiner* — William R Harp
(74) *Attorney, Agent, or Firm* — Peter Zacharias; Patrick Sheldrake

(57) ABSTRACT

A conveyor used with a harvester such as a wind rower has a chute at its discharge end with a deflection surface which controls the throw trajectory and thus the throw range of crop being cut. The orientation angle of the deflection surface relatively to the conveyor may be varied as a function of the particular crop throw characteristics to change the throw range of the conveyor as needed to form merged windrows of a particular crop while avoiding windrow widths which are too wide for efficient harvesting.

25 Claims, 6 Drawing Sheets

MERGER EXTENSION CHUTE AND CONVEYOR

FIELD OF THE INVENTION

This invention concerns conveyors used with windrowers, and chutes for controlling the discharge from the conveyors when forming windrows.

BACKGROUND

Efficient harvesting of crop windrows requires that the windrow width be controlled so that harvesters can pick up each swath of cut crop. Crops have different characteristics which affect the "throw" from the windrower. Characteristics which affect the throw include crop moisture content, density, and crop structure. For example, a windrower will throw a well packed, moist and dense crop mat, such as timothy farther than a crop presenting a loose, dry mat, such as dry alfalfa if no adjustments are made to the windrower to take the difference in crop throw characteristics into account. Unless adjustments to the windrower can be made when a different crop is being cut, merged windrows having alternating swaths which lay partially on top or even beside one another may be formed rather than narrow windrows in which alternating swaths lie directly on top of one another. If windrows become too wide, some harvesters will be unable to pick up the merged swaths. There is clearly an opportunity to improve the efficiency of windrowing of merged crops.

SUMMARY

The invention concerns a chute attachable to a conveyor adapted to move product along a line of motion from a first end of the conveyor to a second end thereof. In an example embodiment the chute comprises first and second side panels mountable on opposite sides of the conveyor and proximate to the second end thereof. The first and second side panels define an intake for receiving the product. A deflector assembly is mountable on the conveyor proximate to the second end thereof. The deflector assembly is pivotable about an axis oriented transversely to at least one of the side panels and the line of motion. The deflector assembly comprises a deflector surface. An orientation angle of the deflector surface is adjustable with respect to the line of motion upon pivoting of the deflector assembly.

Further by way of example, a wing panel may be mounted on the first side panel. The wing panel is angularly oriented with respect to the first side panel for guiding the product into the intake. In another example the deflector assembly comprises first and second sidewalls positioned in spaced apart relation along opposite edges of the deflector surface to form a channel. In a specific example embodiment the first and second sidewalls and the first and second side panels are oriented perpendicularly to the axis.

In an example embodiment a first hinge attaches the first sidewall to the first panel and a second hinge attaches the second sidewall to the second panel. By way of example the first and second hinges may be positioned distal to the deflector surface. In an example embodiment the channel is pivotable on the hinges between a first position wherein the deflector surface is co-linear with the line of motion and a second position wherein the deflector surface is in facing relation with the line of motion.

An example embodiment may further comprise at least one actuator mounted between one of the first or second side panels and the deflector assembly. The actuator adjusts the angle of orientation of the deflector surface. By way of example at least one actuator may be mounted between one of the first or second side panels and one of the first or second sidewalls, the actuator for adjusting the angle of orientation of the deflector surface. The actuator may be selected from the group consisting of hydraulic actuators, electrical actuators and mechanical actuators.

The invention further encompasses a conveyor mountable on a harvester. The conveyor is adapted to receive product and move the product along a line of motion from a first end of the conveyor to a second end thereof. In one example embodiment the conveyor comprises a frame and a belt supported on the frame. The belt has an upper surface movable along a line of motion. First and second side panels are mounted on opposite sides of the frame and proximate to the second end of the conveyor. The first and second side panels define an intake for receiving the product. A deflector assembly is mounted on the conveyor proximate to the second end thereof. The deflector assembly is pivotable about an axis oriented transversely to at least one of the side panels and the line of motion. The deflector assembly comprises a deflector surface. An orientation angle of the deflector surface is adjustable with respect to the line of motion upon pivoting of the deflector assembly.

The conveyor may further comprise a wing panel mounted on the first side panel. The wing panel is angularly oriented with respect to the first side panel for guiding the product into the intake. In an example embodiment the deflector assembly comprises first and second sidewalls positioned in spaced apart relation along opposite edges of the deflector surface to form a channel. In a particular example embodiment the first and second sidewalls and the first and second side panels are oriented perpendicularly to the axis.

In a further example conveyor a first hinge attaches the first sidewall to the first panel and a second hinge attaches the second sidewall to the second panel. The first and second hinges may be positioned distal to the deflector surface by way of example. In an example embodiment the channel is pivotable on the hinges between a first position wherein the deflector surface is substantially coplanar with the upper surface of the belt and a second position wherein the deflector surface is in facing relation with a portion of the upper surface of the belt.

An example conveyor may further comprise at least one actuator mounted between one of the first or second side panels and the deflector assembly. The actuator adjusts the angle of orientation of the deflector surface. The actuator may be mounted between one of the first or second side panels and one of the first or second sidewalls for adjusting the angle of orientation of the deflector surface. By way of example, the actuator is selected from the group consisting of hydraulic actuators, electrical actuators and mechanical actuators.

The invention further encompasses a harvester. An example harvester according to the invention comprises a conveyor mounted thereon. The conveyor is adapted to receive product and move the product along a line of motion from a first end of the conveyor to a second end thereof. By way of example the conveyor comprises a frame and a linkage extending between the frame and the harvester for mounting the conveyor thereon. The conveyor is movable between a raised and a lowered position via the linkage. A belt is supported on the frame. The belt has an upper surface movable along a line of motion. First and second side panels are mounted on opposite sides of the frame and proximate to the second end of the conveyor. The first and second side panels define an intake for receiving the product. A deflector assembly is mounted on the conveyor proximate to the second end thereof. The deflector assembly is pivotable about an axis oriented transversely to at least one of the side panels and the line of motion. The deflector assembly comprising a deflector surface. An orientation angle of the deflector surface is adjustable with respect to the line of motion upon pivoting of the deflector assembly.

In an example embodiment the harvester may comprise a wing panel mounted on the first side panel. The wing panel is angularly oriented with respect to the first side panel for guiding the product into the intake. Further by way of example the deflector assembly may comprise first and second sidewalls positioned in spaced apart relation along opposite edges of the deflector surface to form a channel. In a specific example the first and second sidewalls and the first and second side panels are oriented perpendicularly to the axis. By way of example a first hinge attaches the first sidewall to the first panel and a second hinge attaches the second sidewall to the second panel. In a particular example, the first and second hinges are positioned distal to the deflector surface. In an example embodiment the channel is pivotable on the hinges between a first position wherein the deflector surface is substantially coplanar with the upper surface of the belt and a second position wherein the deflector surface is in facing relation with a portion of the upper surface of the belt.

An example harvester embodiment may further comprise at least one actuator mounted between one of the first or second side panels and the deflector assembly. The actuator adjusts the angle of orientation of the deflector surface. By way of example the actuator may be controllable remotely from within the harvester. In an example, the harvester comprises at least one actuator mounted between one of the first or second side panels and one of the first or second sidewalls. The actuator adjusts the angle of orientation of the deflector surface. In an example embodiment the actuator is selected from the group consisting of hydraulic actuators, electrical actuators and mechanical actuators. Further by way of example, the linkage may comprise a four bar mechanism. An actuator acts between the harvester and the linkage for effecting movement of the conveyor between the raised and the lowered position. In an example embodiment the actuator is controllable remotely from within the harvester.

DETAILED DESCRIPTION

Figure 1:
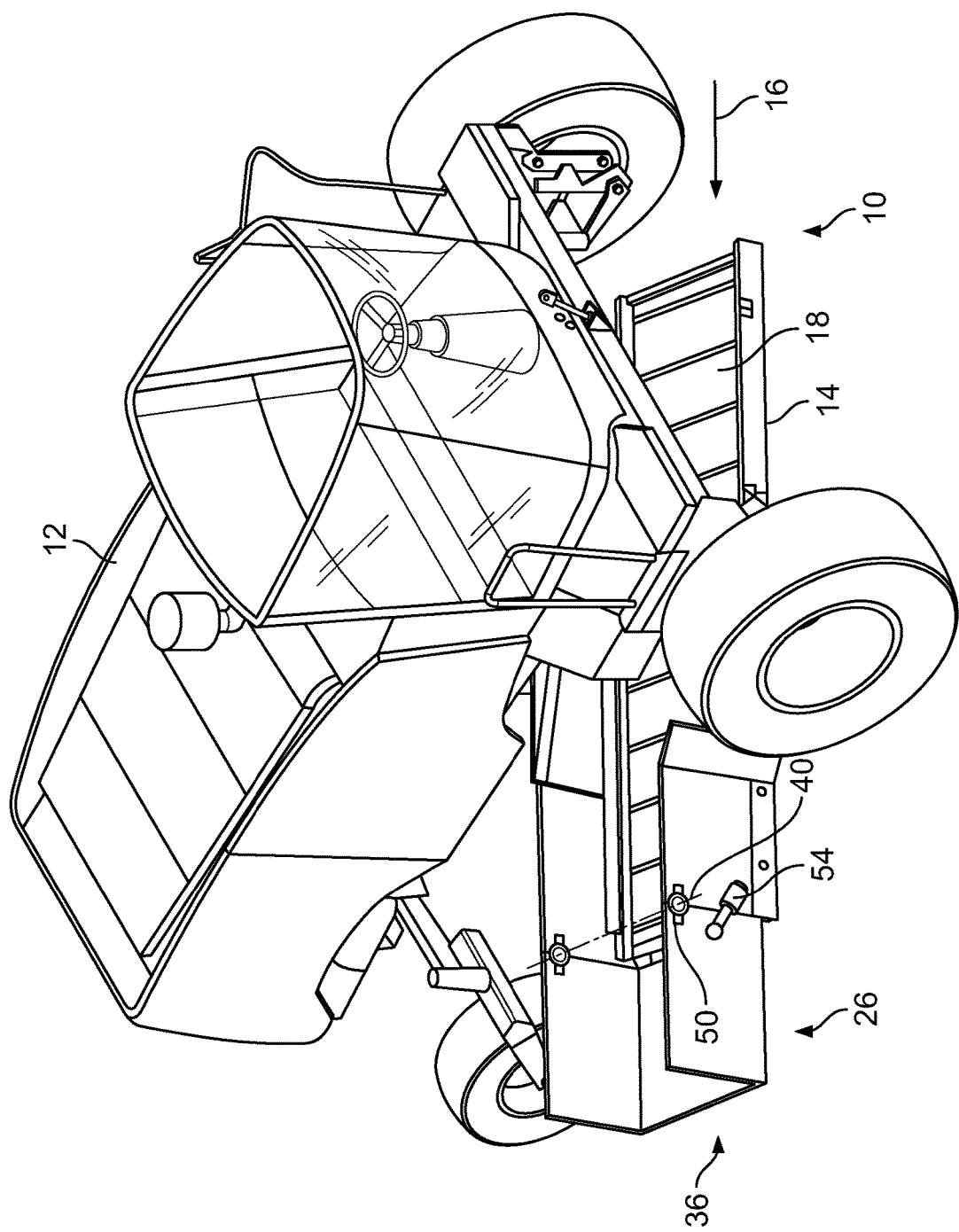
FIG. 1 is an isometric view of an example conveyor according to the invention showing the conveyor mounted on a harvester in a lowered position for field use.
Figure 1A:
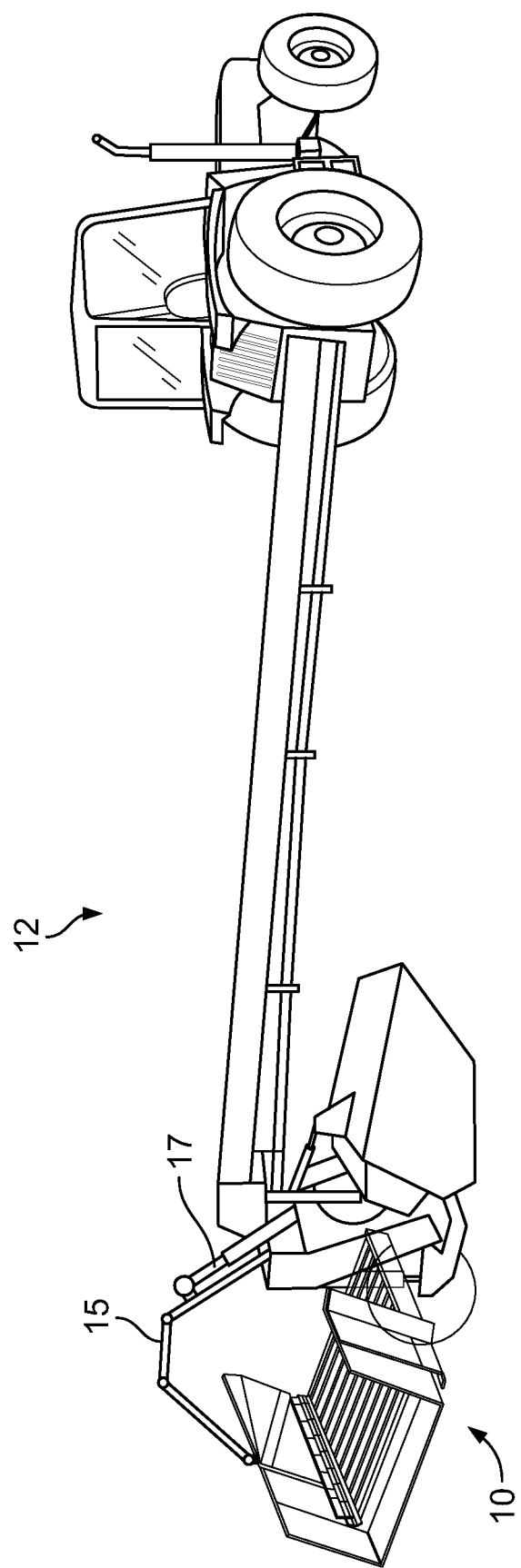
FIG. 1A is an isometric view of an example conveyor according to the invention showing the conveyor mounted on a towed harvester.
Figure 2:
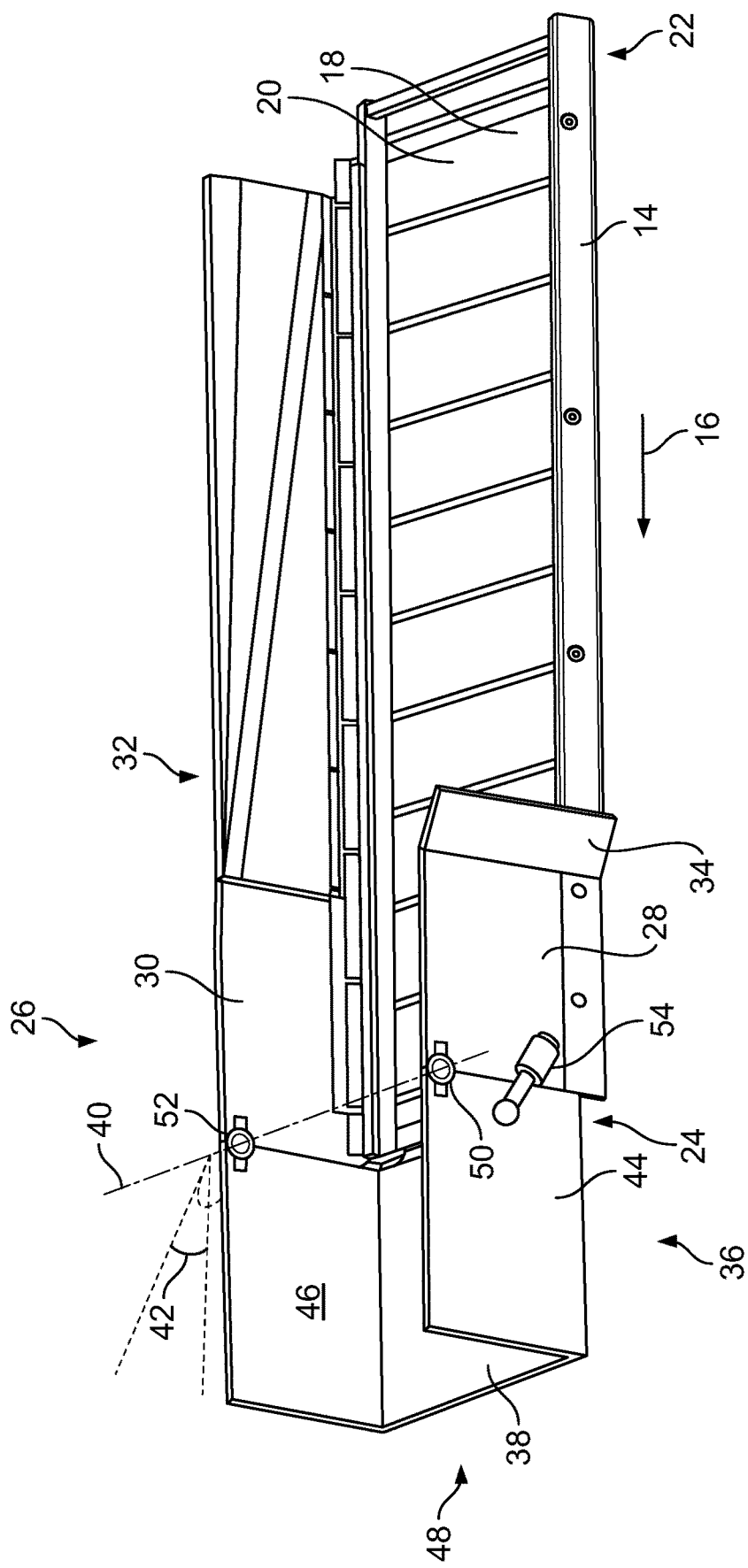
FIG. 2 is an isometric view of the example conveyor shown in FIGS. 1 and 2 and showing, in detail, an example chute according to the invention in the deployed configuration.
Figure 3:
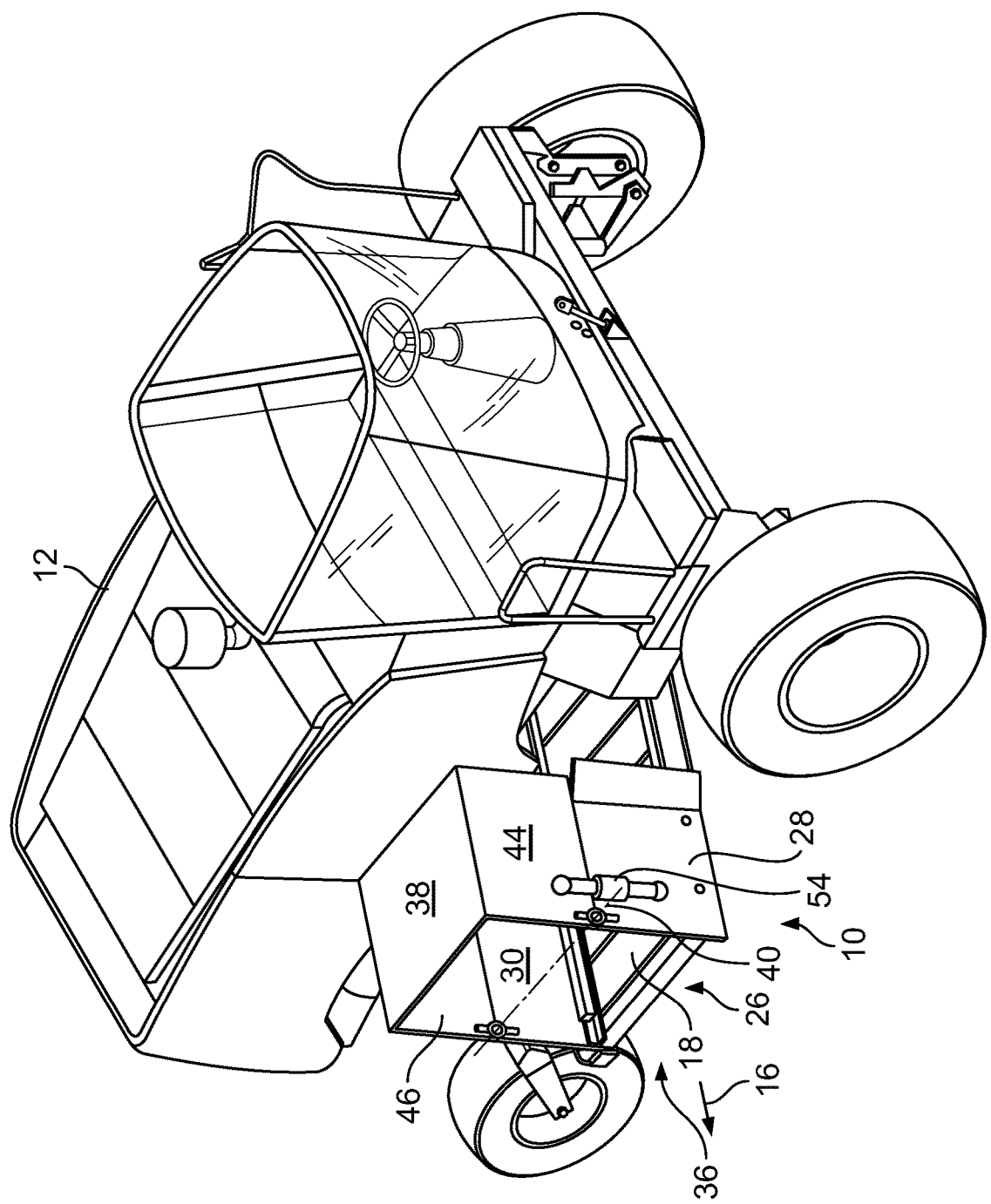
FIG. 3 is an isometric view of the example conveyor of FIG. 1 mounted on a harvester with the chute in a stowed configuration and the conveyor in a raised position for transport.
Figure 3A:
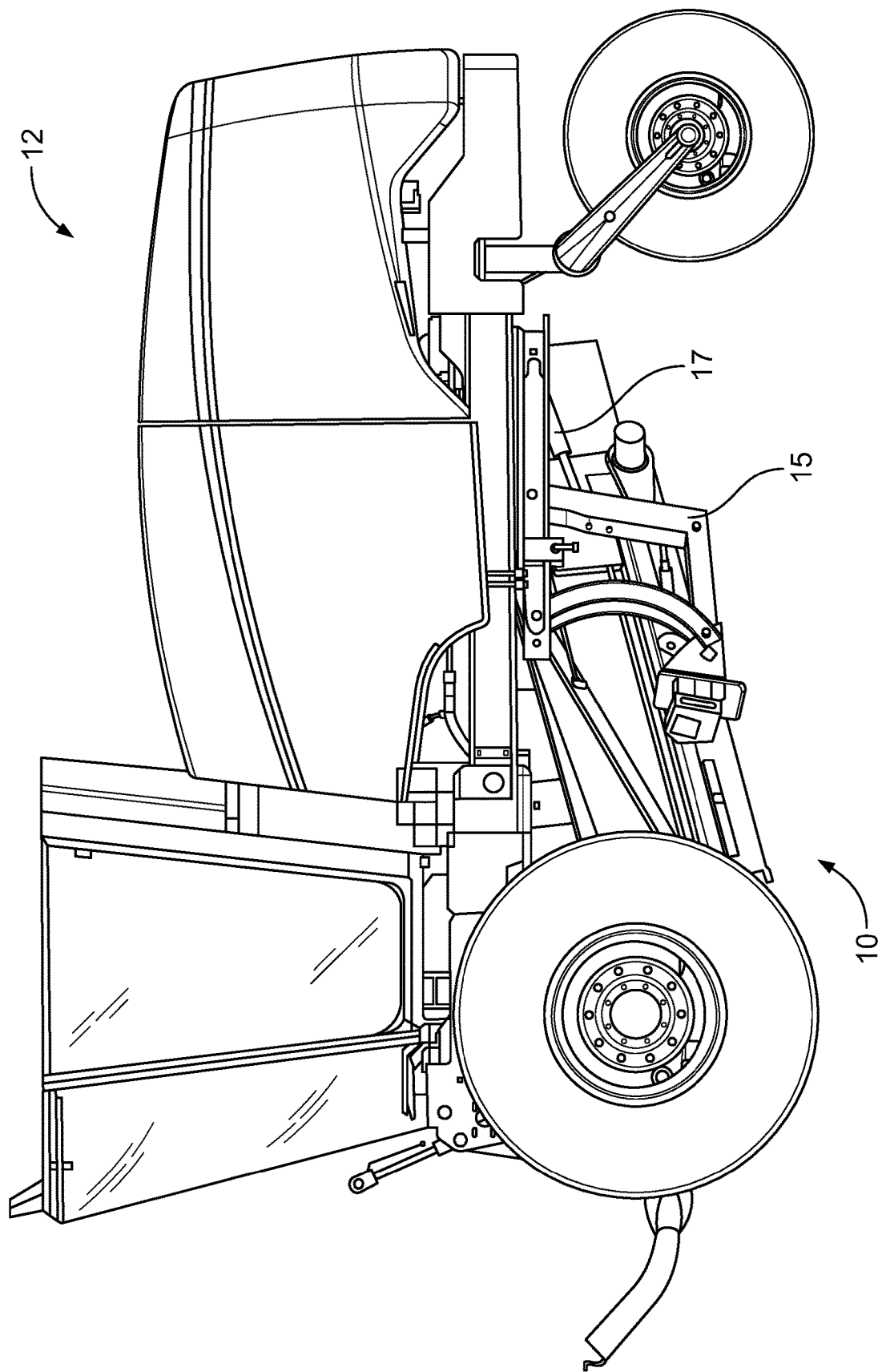
FIG. 3A is a side view of a harvester showing an example linkage for mounting a conveyor on the harvester.

FIG. 1 shows an example embodiment of a conveyor 10 according to the invention. Conveyor 10 is mounted on a harvester 12. "Harvester" as used herein includes tractors, combines, windrowers, mowers, balers and other agricultural machinery, both self-propelled and towed (see also FIG. 1A). In FIG. 1 conveyor 10 is shown in the lowered position ready to receive product, such as crop material, cut or picked up by a header (not shown), and throw the product to the side of the harvester and form a windrow. As shown in FIG. 2, conveyor 10 comprises a frame 14 extending along a line of motion 16 of the product. Line of motion 16 is defined by the motion of a belt 18 supported on the frame 14. The belt 18 has an upper surface 20 which moves from a first end 22 of the conveyor 10 to a second end 24 as the belt is driven in a closed loop around frame 14. As is well understood by those of skill in the art, belt 18 may be supported on rollers (not shown) rotatably mounted on frame 14, there being a drive roller which moves belt 18, the drive roller being rotated by a belt drive, chain drive, gear drive, hydraulic or electrical motor or other mechanism receiving motive power from the harvester 12. As shown in FIGS. 1 and 3, conveyor 10 and is movable on harvester 12 between a lowered position (FIG. 1) for field use and a raised position (FIG. 3) for transport between fields. As shown in FIG. 3A, the conveyor 10 is attached to the harvester 12 using a linkage 15, in this example a four bar linkage which extends between the harvester 10 and the conveyor frame 14. An actuator 17 extends between the harvester 12 and the linkage 15 to effect motion of the conveyor 10 between the raised and lowered positions. Any one of various types of actuators 17 may be used, for example, hydraulic, electrical or mechanical actuators. The actuator 17 may be controlled remotely from within the harvester 12 by an operator. FIG. 1A shows a linkage 15 and actuator 17 mounting conveyor 10 on a towed harvester 12.

As shown in FIG. 2 conveyor 10 comprises a chute 26 attachable to the conveyor. In the example embodiment shown in FIG. 2, chute 26 comprises first and second side panels 28 and 30 mounted on opposite sides of the conveyor 10 proximate to its second end 24. In this embodiment the panels 28 and 30 are bolted directly to frame 14 and form an intake 32 for receiving product from the belt 18. A wing panel 34 is mounted on the first side panel 28. Wing panel 34 is angularly oriented with respect to the first side panel 28 and serves to guide product from the belt 18 into the intake 32.

Chute 26 further comprises a deflector assembly 36 mounted on the conveyor 10 proximate to its second end 24. Deflector assembly 36 comprises a deflector surface 38 and is pivotable about an axis 40 which is oriented transversely to the line of motion 16 and at least one of the side panels 28, 30. Pivoting motion of the deflector assembly 36 about axis 40 allows for an orientation angle 42 to be established between the deflector surface 38 and the line of motion 16. The adjustability of the orientation angle 42 permits the trajectory of product throw to be controlled, thereby controlling the range of the throw as described below.

In the example embodiment shown in FIG. 2, the deflector assembly 36 further comprises first and second sidewalls 44 and 46 positioned in spaced apart relation along opposite edges of deflector surface 38 to form a channel 48. Channel 48 guides the throw of the product from the conveyor 10.

Sidewalls 44 and 46 are oriented perpendicularly to the axis 40, as are side panels 28 and 30. The first and second side walls 44 and 46 are respectively attached to the first and second side panels 28 and 30 via respective first and second hinges 50 and 52. Hinges 50 and 52 are positioned distal to the deflector surface 38, in this example at the upper corners of the panels 28 and 30. This configuration of side panels 28 and 30, sidewalls 44 and 46 and hinges 50 and 52 permits the deflector assembly 36 to pivot between a first position, shown in FIGS. 1 and 2, wherein the deflector surface 38 is co-linear with the line of motion 16 and substantially coplanar with the upper surface 20 of the belt 18, and a second position, shown in FIG. 3, wherein the deflector surface 38 is in facing relation with the line of motion 16 and with a portion of the belt 18. The term "substantially coplanar" in this example means that the surfaces are within the same plane or within planes offset from one another by an amount which will not prevent transfer of product from the belt 18 to the channel 48. The second position of the deflector assembly 36 shown in FIG. 3 may be considered a stowed configuration used when the conveyor 10 is raised and being transported between fields.

Pivoting motion of the deflector assembly 36 and establishment of the orientation angle 42 may be effected manually, or by one or more actuators 54. As shown in FIG. 2, actuator 54 extends between the first side panel 28 and the first sidewall 44 and operates to pivot the deflector assembly 36 about axis 40 and thereby establish the orientation angle 42 of the deflector surface 38. Alternately, actuator 54 may be mounted on panels 30 and 46. As those of skill in the art understand, any one of various types of actuators 54 may be used, for example, hydraulic, electrical or mechanical actuators. Actuator 54 may be conveniently controlled from within the harvester 12 by an operator.

Figure 4:
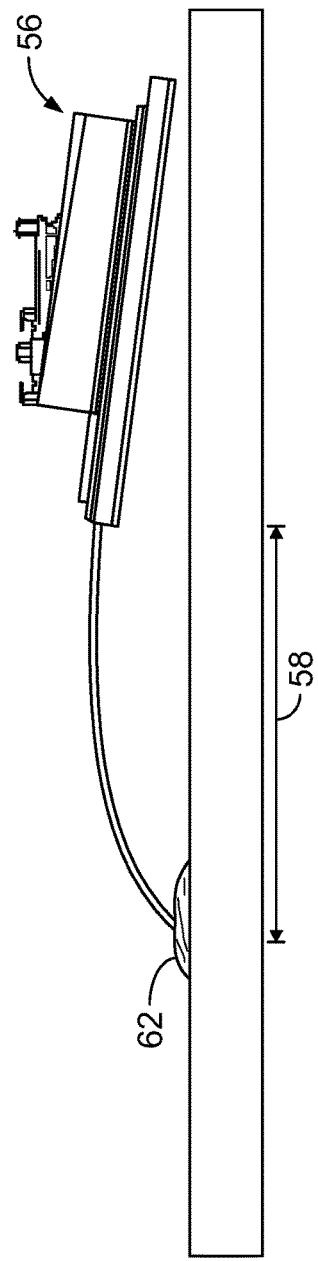
FIG. 4 shows a side views of a prior art conveyor in operation.
Figure 5:
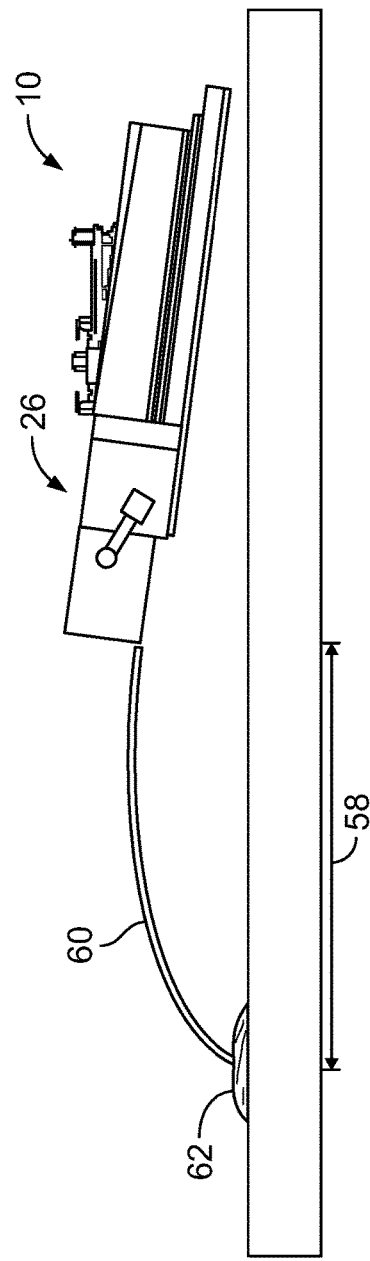
FIGS. 5 and 6 show side views of the example chute according to the invention in operation.
Figure 6:
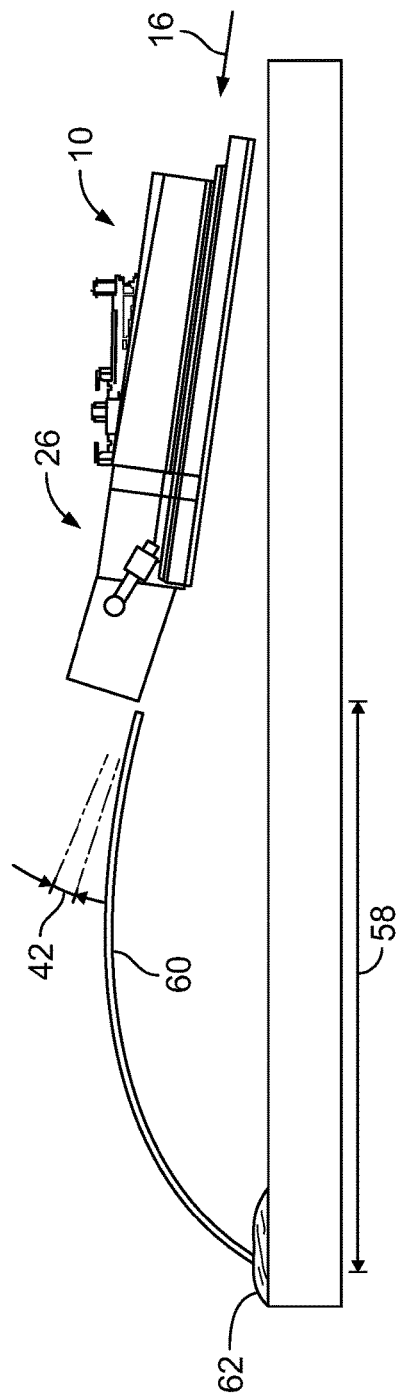

FIGS. 5 and 6 illustrate the effect of the chute 26 and conveyor 10 in comparison with a prior art conveyor 56 shown in FIG. 4. FIG. 4 shows conveyor 56, which, without the chute 26, has a limited throw range 58 determined by the belt speed, belt angle and product throw characteristics (e.g., moisture content, density, and crop structure). More importantly, the prior art conveyor 56 provides only limited capability to vary the throw range as a function of the crop throw characteristics. The ability to change the throw range becomes important when using the windrower on different crops having different throw characteristics. For example, the prior art conveyor 56 will throw a first crop, having a well packed, moist and dense mat, farther than a second crop presenting a loose, dry mat if no adjustments are made to the conveyor when switching between the crops. This may result in merged windrows for one or even both crops having alternating swaths laying partially on top of one another or beside one another. This is disadvantageous as it leads to wider merged windrows which are difficult for harvesters to pick up efficiently.

As shown in FIG. 5, the mere presence of the chute 26 is expected to extend the throw range 58 of any crop, and, as shown in FIG. 6, the throw range can be further controlled by adjusting and establishing the orientation angle 42 of the deflector surface 38. Crop material 60 is projected with force from the belt 18 into intake 32 of chute 26 and against the deflector surface 38 whose orientation angle 42 may be established, as shown in FIG. 6, to deflect alternating swaths of a first crop material having particular throw characteristics into a windrow 62 wherein the swaths lie neatly atop one another. When a windrower having a conveyor according to the invention is then used on a second crop having different throw characteristics, the orientation angle 42 of the deflector surface 38 may be conveniently adjusted to increase or decrease the throw range as necessary to account for the different throw characteristics of the second crop and form a merged windrow wherein alternating swaths also lay neatly on top of one another.

What is claimed is:

1. A chute attachable to a conveyor adapted to move product along a line of motion from a first end of said conveyor to a second end thereof, said chute comprising:
   first and second side panels mountable on opposite sides of said conveyor and proximate to said second end thereof, said first and second side panels defining an intake for receiving said product;
   a deflector assembly mountable on said conveyor proximate to said second end thereof, said deflector assembly being pivotable about an axis oriented transversely to at least one of said side panels and said line of motion, said deflector assembly comprising a deflector surface, an orientation angle of said deflector surface being adjustable with respect to said line of motion upon pivoting of said deflector assembly, said deflector assembly further comprising first and second sidewalls positioned in spaced apart relation along opposite edges of said deflector surface to form a channel;
   a first hinge attaching said first sidewall to said first panel; and
   a second hinge attaching said second sidewall to said second panel,
   wherein said first and second sidewalls and said first and second side panels are oriented perpendicularly to said axis.

2. The chute according to claim 1, further comprising a wing panel mounted on said first side panel, said wing panel being angularly oriented with respect to said first side panel for guiding said product into said intake.

3. The chute according to claim 1, wherein said first and second hinges are positioned distal to said deflector surface.

4. The chute according to claim 3, wherein said channel is pivotable on said hinges between a first position wherein said deflector surface is co-linear with said line of motion and a second position wherein said deflector surface is in facing relation with said line of motion.

5. The chute according to claim 4, further comprising at least one actuator mounted between one of said first or second side panels and one of said first or second sidewalls, said actuator for adjusting said angle of orientation of said deflector surface.

6. The chute according to claim 5, wherein said actuator is selected from the group consisting of hydraulic actuators, electrical actuators and mechanical actuators.

7. The chute according to claim 1, further comprising at least one actuator mounted between one of said first or second side panels and said deflector assembly, said actuator for adjusting said angle of orientation of said deflector surface.

8. A conveyor mountable on a harvester, said conveyor adapted to receive product and move said product along a line of motion from a first end of said conveyor to a second end thereof, said conveyor comprising:
   a frame;
   a belt supported on said frame, said belt having an upper surface movable along a line of motion;
   first and second side panels mounted on opposite sides of said frame and proximate to said second end of said conveyor, said first and second side panels defining an intake for receiving said product;

a deflector assembly mounted on said conveyor proximate to said second end thereof, said deflector assembly being pivotable about an axis oriented transversely to at least one of said side panels and said line of motion, said deflector assembly comprising a deflector surface, an orientation angle of said deflector surface being adjustable with respect to said line of motion upon pivoting of said deflector assembly, said deflector assembly further comprising first and second sidewalls positioned in spaced apart relation along opposite edges of said deflector surface to form a channel;

a first hinge attaching said first sidewall to said first panel; and a second hinge attaching said second sidewall to said second panel, wherein said first and second sidewalls and said first and second side panels are oriented perpendicularly to said axis.

9. The conveyor according to claim 8, further comprising a wing panel mounted on said first side panel, said wing panel being angularly oriented with respect to said first side panel for guiding said product into said intake.

10. The conveyor according to claim 8, wherein said first and second hinges are positioned distal to said deflector surface.

11. The conveyor according to claim 10, wherein said channel is pivotable on said hinges between a first position wherein said deflector surface is substantially coplanar with said upper surface of said belt and a second position wherein said deflector surface is in facing relation with a portion of said upper surface of said belt.

12. The conveyor according to claim 11, further comprising at least one actuator mounted between one of said first or second side panels and one of said first or second sidewalls, said actuator for adjusting said angle of orientation of said deflector surface.

13. The conveyor according to claim 12, wherein said actuator is selected from the group consisting of hydraulic actuators, electrical actuators and mechanical actuators.

14. The conveyor according to claim 8, further comprising at least one actuator mounted between one of said first or second side panels and said deflector assembly, said actuator for adjusting said angle of orientation of said deflector surface.

15. A harvester comprising:
a chassis;
a pair of front wheels mounted to the chassis;
a pair of rear wheels mounted to the chassis;
a conveyor mounted to the chassis between the pair of front wheels and the pair of rear wheels, said conveyor adapted to receive product and move said product along a line of motion from a first end of said conveyor to a second end thereof, said conveyor comprising:
a frame;
a linkage extending between said frame and said harvester for mounting said conveyor thereon, said conveyor being movable between a raised and a lowered position via said linkage;
a belt supported on said frame, said belt having an upper surface movable along a line of motion;
first and second side panels mounted on opposite sides of said frame and proximate to said second end of said conveyor, said first and second side panels defining an intake for receiving said product; and
a deflector assembly mounted on said conveyor proximate to said second end thereof, said deflector assembly being pivotable about an axis oriented transversely to at least one of said side panels and said line of motion, said deflector assembly comprising a deflector surface, an orientation angle of said deflector surface being adjustable with respect to said line of motion upon pivoting of said deflector assembly, said deflector assembly further comprising first and second sidewalls positioned in spaced apart relation along opposite edges of said deflector surface to form a channel;

a first hinge attaching said first sidewall to said first panel; and a second hinge attaching said second sidewall to said second panel, wherein said first and second sidewalls and said first and second side panels are oriented perpendicularly to said axis, and wherein said first and second hinges are positioned distal to said deflector surface.

16. The harvester according to claim 15, wherein the conveyor further comprises a wing panel mounted on said first side panel, said wing panel being angularly oriented with respect to said first side panel for guiding said product into said intake.

17. The harvester according to claim 15, wherein said first and second hinges are positioned distal to said deflector surface.

18. The harvester according to claim 17, wherein said channel is pivotable on said hinges between a first position wherein said deflector surface is substantially coplanar with said upper surface of said belt and a second position wherein said deflector surface is in facing relation with a portion of said upper surface of said belt.

19. The harvester according to claim 18, wherein the conveyor further comprises at least one actuator mounted between one of said first or second side panels and one of said first or second sidewalls, said actuator for adjusting said angle of orientation of said deflector surface.

20. The harvester according to claim 19, wherein said actuator is selected from the group consisting of hydraulic actuators, electrical actuators and mechanical actuators.

21. The harvester according to claim 15, wherein the conveyor further comprises at least one actuator mounted between one of said first or second side panels and said deflector assembly, said actuator for adjusting said angle of orientation of said deflector surface.

22. The harvester according to claim 21, wherein said actuator is controllable remotely from within said harvester.

23. The harvester according to claim 15, wherein said linkage comprises a four bar mechanism.

24. The harvester according to claim 23, further comprising an actuator acting between said harvester and said linkage for effecting movement of said conveyor between said raised and said lowered position.

25. The harvester according to claim 24, wherein said actuator is controllable remotely from within said harvester.

* * * * *